G. A. SWARTZ.
WIND-MILL.
No. 6,996.
Reissued March 14, 1876.
Fig. 1.
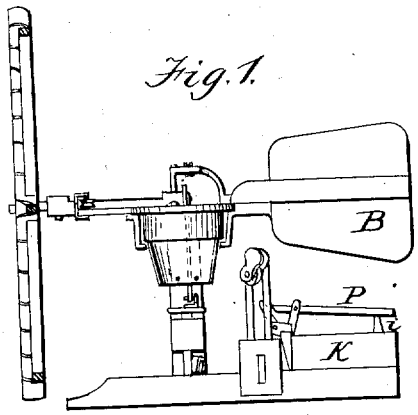
Fig. 2.
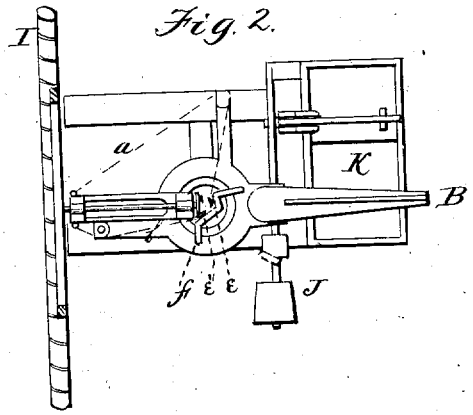
Fig. 3.
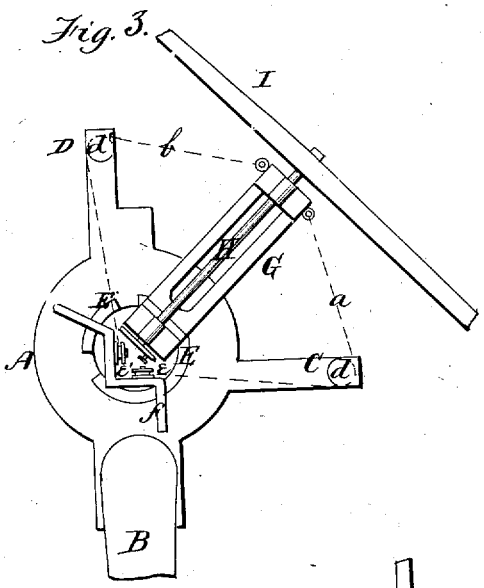
Fig. 5.
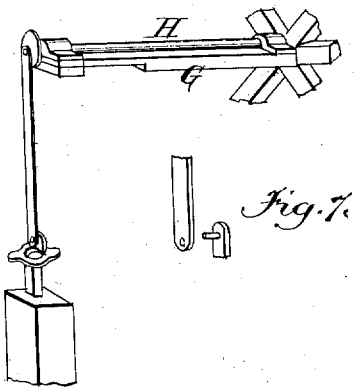
Fig. 7.
Fig. 4.
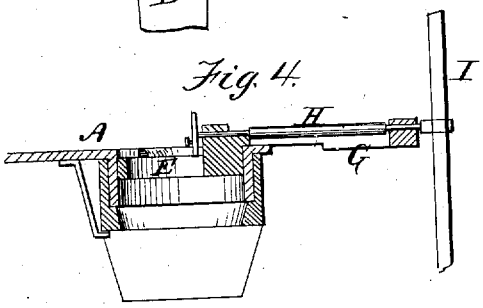
Fig. 6.
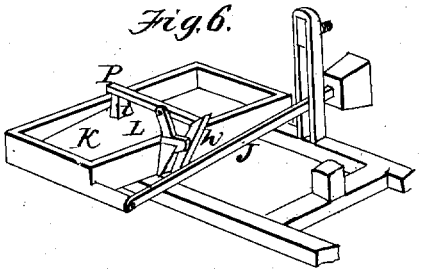
Witnesses:
Geo. Lewis
M. Chauncey
Inventor;
Geo. A. Swartz.
By Hill & Ellsworth
His Attys.

UNITED STATES PATENT OFFICE.

GEORGE A. SWARTZ, OF TWIN GROVE, ASSIGNOR TO THE ECLIPSE WINDMILL COMPANY, OF BELOIT, WISCONSIN.

IMPROVEMENT IN WINDMILLS.

Specification forming part of Letters Patent No. 137,111, dated March 25, 1873; reissue No. 6,996, dated March 14, 1876; application filed March 1, 1876.

*To all whom it may concern:*

Be it known that I, GEORGE A. SWARTZ, of Twin Grove, in the county of Green and State of Wisconsin, (assignor to THE ECLIPSE WINDMILL COMPANY, of Beloit, in the county of Rock and State of Wisconsin,) have invented certain new and useful Improvements in Windmills; and I do hereby declare the following to be a full, clear, and exact description of the same, reference being had to the accompanying drawings, forming part of this specification, in which—

Figure 1 is a side elevation, and Fig. 2 a plan, of the windmill; and Figs. 4, 5, 6, and 7 are enlarged detached views of various parts of the same.

Similar letters of reference in the accompanying drawings denote the same parts.

In that class of windmills in which the wheel is regulated by turning it into or out of the wind, there are certain advantages in having the wheel and shaft mounted upon a separate frame swinging upon and independent of the turn-table carrying the vane, and, accordingly, efforts have been made, as shown in the Letters Patent granted to William C. Chambers and Thomas S. Hargraves, dated August 26, 1856, No. 15,599, to apply such principle of construction. The difficulty with all such structures, however, has been that the mode heretofore adopted for connecting the wheel-frame to the turn-table that carries the tail-vane, has been such as to render it impossible to use a mill-head with an open center, so as to connect the wheel-shaft on the head with mechanism extending down through the open center to the pump or other machinery to be operated. The use of the open center, on the other hand, is of great importance, as it permits the connection of the pump-rod or vertical driving shaft or belt directly to the wind-wheel shaft, by means of a crank, wrist-pin, eccentric, gear-wheel, pulley, or other equivalent simple device, and at the same time permits the requisite arrangement of such vertical rod, shaft, or belt at the axis of rotation of the mill. The object of my invention is, therefore, to combine, in a windmill, the wheel and shaft mounted upon a separate frame swinging upon and independent of the vane-frame or table, with such open-center head, adapted to the direct connection of the horizontal wheel-shaft, with the vertical actuating rod, shaft, or belting; and my invention consists, first, in such combination, broadly; and, secondly, in the devices constructed and operating to produce the desired result, as I will now proceed to describe.

In the drawings, A represents the turn-table of a windmill, provided with the usual tail-vane B. The turn-table is also provided with an interior collar or ring, E, which is capable of turning within and independent of the turn-table, and will also turn with the same. The collar or ring E is firmly attached to a frame, G, resting horizontally upon the upper surface of the turn-table, and supporting the shaft H of a wind-wheel, I, constructed in any of the known and usual forms. This arrangement leaves the mill-head open at the center, and enables the actuating-rod or device, by which the power of the wheel-shaft is applied, to be connected directly to said shaft in line with the vertical axis of rotation of the mill, and as it permits the use of other devices than the vertical shaft heretofore used for applying the power of the horizontal wheel-shaft, it thereby enables me to avoid the "side draft" of the operating machinery below, and to reduce the whole mill to an exceedingly simple, compact, convenient, and effective form. For the purpose of throwing the wheel out of or into the wind I employ two cords, *a b*, extending from opposite sides of the frame G down through the open center of the mill-head, said cords being passed around pulleys *d d'* at the end of arms C D projecting from the vane-frame or table A, to insure the proper purchase, and also over pulleys *e e'*, arranged on a frame, *f*, to avoid the independent ring E. By pulling on the rope *a* from below the frame G, with the ring E, will swing and carry the wheel out of the wind, and by pulling on the rope *b* the wheel will be brought into the wind again.

For pumps to fill a tank the movement of throwing the wheel out of the wind may be performed automatically by the following means: The rope *a*, after passing downward over the pulley *e*, as above described, may be passed over suitable pulleys, so as to come perpendicularly down, and attached to a heavily-weighted lever, J, pivoted at its other end. The weighted end of this lever being raised is supported on a hook, *h*, which is pivoted on the side of the tank K. In this tank is a lid, L, provided on top with a projection, *i*. As the tank fills with water from the pump this lid rises, and the projection *i* raises the inner end of a lever, P, also pivoted on the tank, and the outer end of which bears against the upper end of the hook *h*. When the tank is full the hook *h* will have been moved sufficiently to release the weighted lever J, which, falling, pulls the rope *a*, so as to throw the wheel out of the wind, as above set forth.

Having thus fully described my invention, what I claim as new, and desire to secure by Letters Patent, is—

1. In a windmill, the combination of the open mill-head, with the wheel-shaft and tail-vane swinging upon separate and independent supports, for the purposes herein set forth.

2. In a windmill, the combination of the wheel and its shaft upon a separate frame swinging upon and independent of the turn-table carrying the vane, with a suitable power-applying device extending vertically through the open center of the mill-head, and connected to the horizontal shaft, substantially as and for the purposes set forth.

3. In a windmill, the combination of an open mill-head, a tail-vane on a suitable support, a wind-wheel on a support capable of swinging independently of the tail-vane, and a wind-wheel shaft extending to or over the central opening of the mill-head, for the purpose of enabling the power-applying devices to be connected directly to the wheel-shaft in line with the axis of rotation of the mill, substantially as described.

4. The combination of the turn-table A with vane B and arms C D, ring or collar E, with frame G, carrying the shaft H and wheel I, ropes *a b*, and pulleys *d d'* and *e e'*, all constructed and arranged to operate substantially as and for the purposes herein set forth.

5. The combination of the tank K, lid L, with projection *i*, lever P, hook *h*, and weighted lever J, all substantially as and for the purposes herein set forth.

GEORGE A. SWARTZ.

Witnesses:

PETER SHECKLER,

H. W. BOLENDER.